(12) United States Patent
Feng (10) Patent No.: US 12,124,135 B2
(45) Date of Patent: Oct. 22, 2024

(54) DISPLAY PANEL AND DISPLAY MODULE (71) Applicant: SHENZHEN CHINA STAR OPTOELECTRONICS SEMICONDUCTOR DISPLAY TECHNOLOGY CO., LTD., Shenzhen (CN)

(72) Inventor: Zhengyu Feng, Shenzhen (CN)

( * ) Notice: Subject to any disclaimer, the term of this patent is extended or adjusted under 35 U.S.C. 154(b) by 0 days.

(21) Appl. No.: 17/297,488

(22) PCT Filed: May 21, 2021

(86) PCT No.: PCT/CN2021/095065
§ 371 (c)(1),
(2) Date: May 27, 2021

(87) PCT Pub. No.: WO2022/227147
PCT Pub. Date: Nov. 3, 2022

(65) Prior Publication Data
US 2024/0019739 A1  Jan. 18, 2024

(30) Foreign Application Priority Data

Apr. 29, 2021 (CN) .......................... 202110475012.X (51) Int. Cl.
*G02F 1/1343* (2006.01)
(52) U.S. Cl.
CPC .............................. *G02F 1/134309* (2013.01)
(58) Field of Classification Search
CPC ............ G02F 1/134309; G02F 1/1343; G02F 1/133707; G02F 1/157
See application file for complete search history.

(56) References Cited

U.S. PATENT DOCUMENTS

2008/0297708 A1    12/2008   Yang
2016/0274409 A1*   9/2016    Kang ................. G02F 1/133512
2020/0026109 A1*   1/2020    Ha ..................... G09G 3/3648

FOREIGN PATENT DOCUMENTS

| CN | 1359026 A | 7/2002 |
|---|---|---|
| CN | 101140743 A | 3/2008 |
| CN | 101349852 A | 1/2009 |
| CN | 103926715 A | 7/2014 |
| CN | 104181725 A | 12/2014 |
| CN | 105093727 A | 11/2015 |
| CN | 105487239 A | 4/2016 |
| CN | 106200152 A | 12/2016 |
| CN | 108181766 A | 6/2018 |
| CN | 110767085 A | 2/2020 |

(Continued)

*Primary Examiner* — Mariam Qureshi (57) ABSTRACT

A display panel and a display module are disclosed. The display panel includes first pixel electrodes and second pixel electrodes arranged in an array and alternately arranged, each of the first pixel electrodes and the second pixel electrodes includes a trunk portion and a plurality of branch portions connected to the trunk portion, the trunk portion divides each of the first pixel electrodes or the second pixel electrodes into at most two domains, and an extension direction of the branch portions in one of the domains of any one of the first pixel electrodes is different from an extension direction of the branch portions in corresponding one of the domains of adjacent one of the second pixel electrodes, thereby relieving diffraction phenomenon.

18 Claims, 7 Drawing Sheets

(56) References Cited

FOREIGN PATENT DOCUMENTS

| | | | |
|---|---|---|---|
| CN | 110767707 | A | 2/2020 |
| CN | 111090197 | A | 5/2020 |
| CN | 210515985 | U | 5/2020 |
| CN | 210516181 | U | 5/2020 |
| CN | 111462637 | A | 7/2020 |
| CN | 111708230 | A | 9/2020 |
| CN | 111833798 | A | 10/2020 |
| CN | 112130371 | A | 12/2020 |
| CN | 112233560 | A | 1/2021 |
| CN | 112346275 | A | 2/2021 |
| JP | H10325945 | A | 12/1998 |
| JP | WO2017068620 | A1 | 8/2018 |
| KR | 20090118391 | A | 11/2009 |
| KR | 20160043595 | A | 4/2016 |

\* cited by examiner

DISPLAY PANEL AND DISPLAY MODULE

BACKGROUND OF INVENTION

Field of Invention

The present disclosure relates to the field of display technology, in particular to a display panel and a display module.

Description of Prior Art

With continuous development of electronic technology, cameras are used more and more widely in various electronic devices. However, appearance of the cameras is inconsistent with their surrounding environment, making them easy to be observed, which greatly impacts aesthetics of electronic devices and is not conducive to development of full screens. By placing the camera under a liquid crystal display, the aesthetics of the electronic devices can be greatly improved, and a degree of freedom in the placement of the cameras can be increased. However, due to low transmittance of a liquid crystal display, diffraction caused by a periodic liquid crystal arrangement greatly impacts imaging quality of an under-screen camera.

In summary, a structure of the existing liquid crystal display needs to be improved.

SUMMARY OF INVENTION

Embodiments of the present disclosure provide a display panel and a display module to solve a technical problem of the existing liquid crystal display that imaging of an under-screen camera is blurred due to serious liquid crystal phase diffraction effect.

In order to solve the above problems, the technical solution provided by the present disclosure is as follows:

An embodiment of the present disclosure provides a display panel, including a first display area and a second display area surrounding the first display area, and including a pixel electrode layer, wherein the pixel electrode layer includes: a plurality of first pixel electrodes and a plurality of second pixel electrodes arranged in an array in the first display area, wherein the first pixel electrodes and the second pixel electrodes are alternately arranged along at least one of a first direction or a second direction, and the first direction and the second direction intersect each other; each of the first pixel electrodes and the second pixel electrodes includes a trunk portion and a plurality of branch portions connected to the trunk portion, the trunk portion divides each of the first pixel electrodes or the second pixel electrodes into at most two domains, extension directions of the branch portions in different domains are different, and the extension directions of the branch portions in a same domain are same; and an angle between any one of branch portions and the trunk portion is 45° or 135°; and an extension direction of the branch portions in one of the domains of any one of the first pixel electrodes is different from an extension direction of the branch portions in corresponding one of the domains of adjacent one of second pixel electrodes, and any adjacent ones of the first pixel electrodes and the second pixel electrodes are symmetrical to each other.

In some embodiments of the present disclosure, an angle between the branch portions in one of the domains of any one of the first pixel electrodes and the branch portions in corresponding one of the domains of adjacent one of the second pixel electrodes is 90 degrees.

In some embodiments of the present disclosure, each of the first pixel electrodes and the second pixel electrodes includes a first domain and a second domain, the first domain and the second domain are arranged along the second direction, and the first pixel electrodes and the second pixel electrodes are alternately arranged along the first direction.

In some embodiments of the present disclosure, an extension direction of the branch portions in the first domain of any one of the first pixel electrodes is same as an extension direction of the branch portions in the second domain of adjacent one of the second pixel electrodes, and an extension direction of the branch portions in the second domain of the first pixel electrodes is same as an extension direction of the branch portions in the first domain of adjacent one of the second pixel electrode.

In some embodiments of the present disclosure, an area of the first domain and an area of the second domain of any one of the first pixel electrodes or the second pixel electrodes are the same.

In some embodiments of the present disclosure, the trunk portion includes a first trunk portion and a second trunk portion that intersect each other, the first trunk portion extends along the first direction, the second trunk portion extends in the second direction, and the first direction is perpendicular to the second direction.

In some embodiments of the present disclosure, any one of the first pixel electrodes and/or the second pixel electrodes includes a frame, and the frame connects ends of the plurality of branch portions, ends of the first trunk portion, and ends of the second trunk portion.

In some embodiments of the present disclosure, the pixel electrode layer further includes a plurality of third pixel electrodes, the plurality of third pixel electrodes are arranged in an array and distributed in the second display area, each of the third pixel electrodes includes a trunk electrode and branch electrodes connected to the trunk electrode, the trunk electrode divides each of the third pixel electrodes into at least four domains, the branch electrodes in different domains extend in different directions, and the branch electrodes in a same domain extend in a same direction.

Another embodiment of the present disclosure also provides another display panel, including a first display area and a second display area surrounding the first display area, and including a pixel electrode layer, wherein the pixel electrode layer includes: a plurality of first pixel electrodes and a plurality of second pixel electrodes arranged in an array in the first display area, wherein the first pixel electrodes and the second pixel electrodes are alternately arranged along at least one of a first direction or a second direction, and the first direction and the second direction intersect each other; each of the first pixel electrodes and the second pixel electrodes includes a trunk portion and a plurality of branch portions connected to the trunk portion, the trunk portion divides each of the first pixel electrodes or the second pixel electrodes into at most two domains, extension directions of the branch portions in different domains are different, and the extension directions of the branch portions in a same domain are same; and an extension direction of the branch portions in one of the domains of any one of the first pixel electrodes is different from an extension direction of the branch portions in corresponding one of the domains of adjacent one of second pixel electrodes.

In some embodiments of the present disclosure, an angle between the branch portions in one of the domains of any one of the first pixel electrodes and the branch portions in corresponding one of the domains of adjacent one of the second pixel electrodes is 90 degrees.

In some embodiments of the present disclosure, any adjacent ones of the first pixel electrodes and the second pixel electrodes are symmetrical to each other.

In some embodiments of the present disclosure, each of the first pixel electrodes and the second pixel electrodes includes a first domain and a second domain, the first domain and the second domain are arranged along the second direction, and the first pixel electrodes and the second pixel electrodes are alternately arranged along the first direction.

In some embodiments of the present disclosure, an extension direction of the branch portions in the first domain of any one of the first pixel electrodes is same as an extension direction of the branch portions in the second domain of adjacent one of the second pixel electrodes, and an extension direction of the branch portions in the second domain of the first pixel electrodes is same as an extension direction of the branch portions in the first domain of adjacent one of the second pixel electrode.

In some embodiments of the present disclosure, an area of the first domain and an area of the second domain of any one of the first pixel electrodes or the second pixel electrodes are the same.

In some embodiments of the present disclosure, the trunk portion includes a first trunk portion and a second trunk portion that intersect each other, the first trunk portion extends along the first direction, the second trunk portion extends in the second direction, and the first direction is perpendicular to the second direction.

In some embodiments of the present disclosure, any one of the first pixel electrodes and/or the second pixel electrodes includes a frame, and the frame connects ends of the plurality of branch portions, ends of the first trunk portion, and ends of the second trunk portion.

In some embodiments of the present disclosure, an angle between any one of branch portions and the trunk portion is 45° or 135°.

In some embodiments of the present disclosure, the pixel electrode layer further includes a plurality of third pixel electrodes, the plurality of third pixel electrodes are arranged in an array and distributed in the second display area, each of the third pixel electrodes includes a trunk electrode and branch electrodes connected to the trunk electrode, the trunk electrode divides each of the third pixel electrodes into at least four domains, the branch electrodes in different domains extend in different directions, and the branch electrodes in a same domain extend in a same direction.

In some embodiments of the present disclosure, the display panel further includes: an array substrate; a color filter substrate disposed opposite to the array substrate; and a liquid crystal layer sandwiched between the array substrate and the color filter substrate.

Another embodiment of the present disclosure further provides a display module, including the display panel of any one of the above embodiments and an optical element, wherein the optical element is disposed on a side away from a light-exiting surface of the display panel, and the optical element corresponds to a first display area of the display panel.

The display panel and the display module provided by embodiments of the present disclosure can increase a grating period of liquid crystals and reduce a diffraction angle through domain reduction design, thereby relieving diffraction phenomenon, reducing a blur degree of an image taken by a camera through a screen, and improving imaging quality of the under-screen camera.

DETAILED DESCRIPTION OF PREFERRED EMBODIMENTS

The present application provides a display panel and a display module. In order to make the purpose, technical solution, and effect of the present application clearer and more definite, the present application is further described in detail below with reference to the accompanying drawings and examples. It should be understood that the specific embodiments described herein are only used to explain the present application, and are not used to limit the present application.

The present disclosure is directed to the technical problem of the existing liquid crystal display that imaging of an under-screen camera is blurred due to serious liquid crystal phase diffraction effect, and proposes embodiments to overcome this defect.

Figure 1:
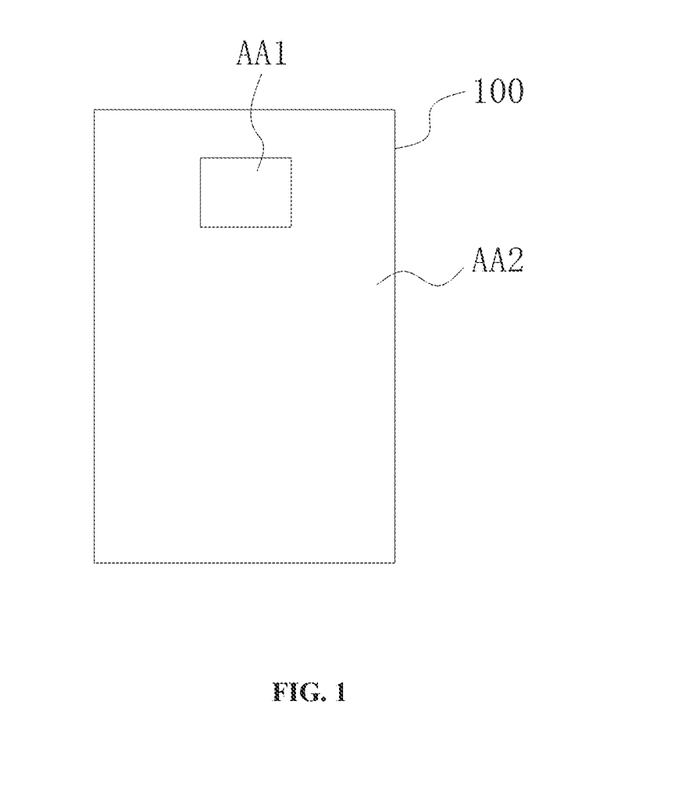
FIG. 1 is a schematic structural diagram of a display panel provided by an embodiment of the present disclosure.

Referring to FIG. 1, an embodiment of the present disclosure provides a display panel 100 including a first display area AA1 and a second display area AA2, and the second display area AA2 surrounds the first display area AA1. The first display area AA1 is used to realize transparent display, so that optical elements such as cameras can be placed in the first display area AA1 and located below the display panel 100 to realize full-screen display of an under-screen camera, while the second display area AA2 is used to realize normal display.

Since the first display area AA1 is used to accommodate optical elements such as cameras, an area of the first display area AA1 is much smaller than an area of the second display area AA2. A number of the first display area AA1 can be one or multiple, depending on a number of optical elements such as cameras. The first display area AA1 may be located at any position of an upper part, a middle part, a lower part, or the like of the display panel 100, which is not particularly limited herein.

Figure 2:
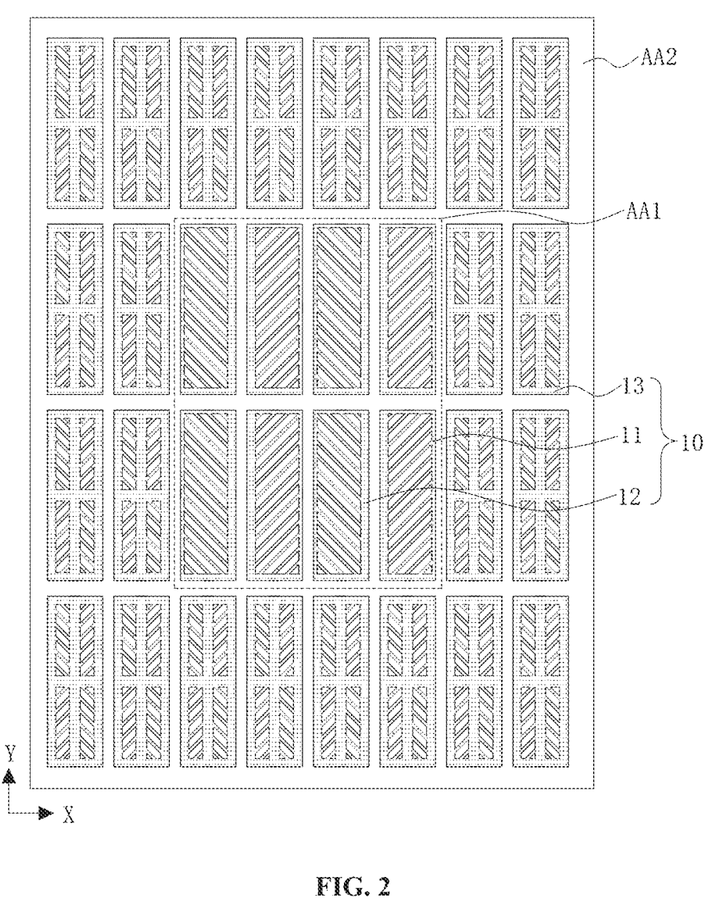
FIG. 2 is a schematic structural diagram of a pixel electrode on the display panel provided by an embodiment of the present disclosure.

Referring to FIG. 2, the display panel 100 includes a pixel electrode layer 10, the pixel electrode layer 10 includes a plurality of first pixel electrodes 11 and a plurality of second pixel electrodes 12, and the first pixel electrodes 11 the second pixel electrodes 12 are both arranged in an array in the first display area AA1.

The first pixel electrodes 11 and the second pixel electrodes 12 are alternately arranged along at least one of a first direction X or a second direction Y, and the first direction X and the second direction Y intersect each other.

The display panel 100 in the embodiment of the present disclosure may be a liquid crystal display panel, which includes an array substrate and a color filter substrate arranged opposite to each other, and a liquid crystal layer sandwiched between the array substrate and the color filter substrate.

The pixel electrode layer 10 may be disposed on a side of the array substrate facing the color filter substrate. A material of the pixel electrode layer 10 may be a transparent conductive material, including, but not limited to indium tin oxide (ITO) material.

Figure 3:
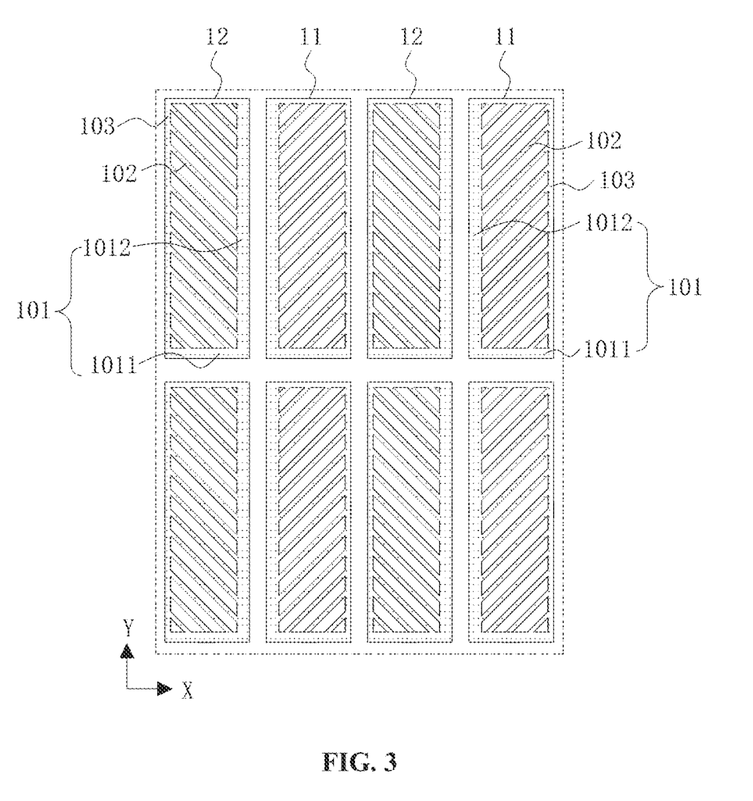
FIG. 3 is a schematic structural diagram of a pixel electrode in a first display area provided by an embodiment of the present disclosure.
Figure 5:
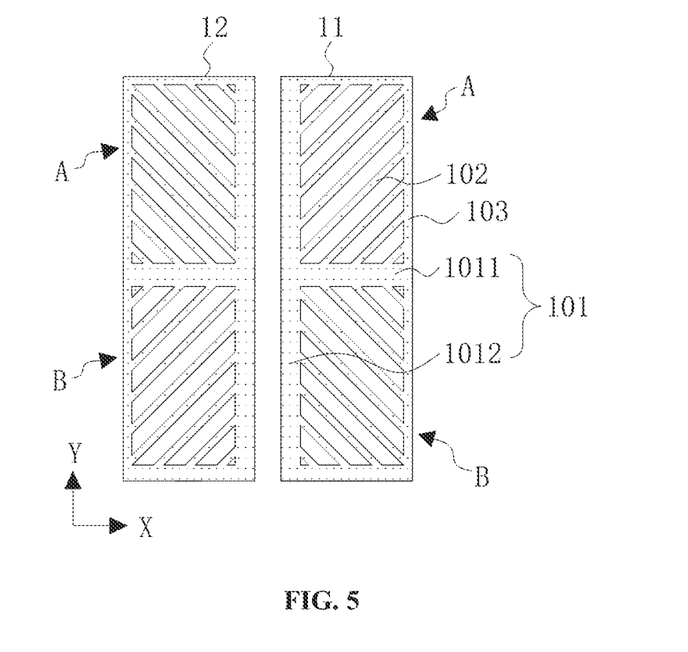
FIG. 5 is a schematic structural diagram of a pixel electrode in the first display area provided by another embodiment of the present disclosure.

Referring to FIGS. 3 and 5, any one of the pixel electrodes (the first pixel electrodes 11 or the second pixel electrodes 12) in the first display area AA1 includes a trunk portion 101 and a plurality of branch portions 102. The branch portions 102 are connected to the trunk portion 101, and the trunk portion 101 divides the pixel electrodes into at most two domains. Extension directions of the branch portions 102 in different domains are different, and the extension directions of the branch portions 102 in a same domain are same.

In some embodiments of the present disclosure, the trunk portion 101 includes a first trunk portion 1011 and a second trunk portion 1012 that intersect each other, and the first trunk portion 1011 and the second trunk portion 1012 divide the pixel electrodes into at most two domains.

The display panel 100 includes a plurality of pixel units distributed in an array, each of the pixel units includes a plurality of sub-pixels, and each of the sub-pixels has a patterned pixel electrode as described above.

In an embodiment of the present disclosure, by changing the pixel electrodes of the first display area AA1 of the display panel 100 from a four-domain design to a single-domain or a double-domain design, a grating period of liquid crystals can be increased, a diffraction angle can be reduced, and deviation of a light wave departing from an original propagation direction decreases, thereby alleviating the diffraction effect.

Further, an extension direction of the branch portions in one of the domains of any one of the first pixel electrodes 11 is different from an extension direction of the branch portions in corresponding one of the domains of adjacent one of second pixel electrodes 12, so that extension directions of the branch portions in any adjacent ones of the domains arranged in the first direction or the second direction are different, and thereby oblique electric fields of different directions generated in the adjacent ones of the domains can induce liquid crystal molecules in different domains (中文有误，漏 寫) to incline in different directions, which can achieve the effect of relieving color shift.

Figure 4:
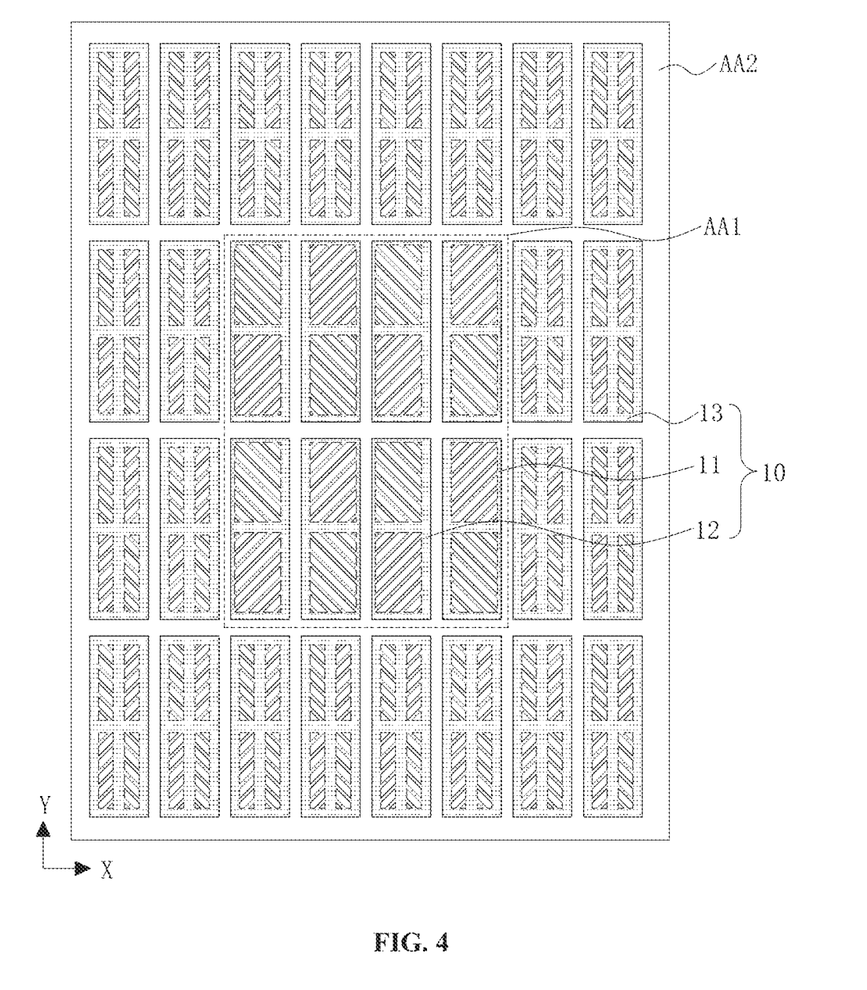
FIG. 4 is a schematic structural diagram of a pixel electrode on the display panel provided by another embodiment of the present disclosure.

Referring to FIGS. 2 and 4, in an embodiment of the present disclosure, each of the pixel electrodes of the first display area AA1 is of a single domain design, and all branch portions 102 of any pixel electrode are located in one domain.

The first trunk portion 1011 extends along a first direction X, and the second trunk portion 1012 extends along a second direction Y. In this embodiment, the first direction X and the second direction Y are perpendicular to each other.

In some embodiments of the present disclosure, the pixel electrodes of the first display area AA1 further include a frame 103 that connects ends of the plurality of branch portions 102, ends of the first trunk portion 1011, and ends of the second trunk portion 1012. The ends of the branch portions 102 refer to other ends opposite to the ends of the branch portions 102 connected to the trunk portion. By connecting a periphery of the pixel electrodes, transmittance of the display panel 100 can be improved.

Referring to FIG. 3, in some embodiments of the present disclosure, the first pixel electrodes 11 and the second pixel electrodes 12 are alternately arranged along the first direction X; the first pixel electrodes 11 and the second pixel electrodes 12 are arranged in alternating rows in the second direction Y.

Referring to FIG. 3, in some embodiments of the present disclosure, an angle between the branch portions 102 in one of the domains of any one of the first pixel electrodes 11 and the branch portions 102 in corresponding one of the domains of adjacent one of the second pixel electrodes 12 is 90 degrees. On the one hand, the angle between the branch portions 102 between adjacent domains is 90 degrees, which is beneficial to improve the transmittance of the display panel. On the other hand, the oblique electric field generated by different domains can induce liquid crystal molecules to incline in different directions, thereby achieving the effect of relieving the color shift.

Further, in some embodiments of the present disclosure, any adjacent ones of the first pixel electrodes 11 and the second pixel electrodes 12 are symmetrical to each other, which is beneficial to relieve the color shift at large viewing angles.

Preferably, an angle between any one of branch portions 102 and the trunk portion connected thereto is 45°, and the transmittance is the maximum at this time.

Figure 6:
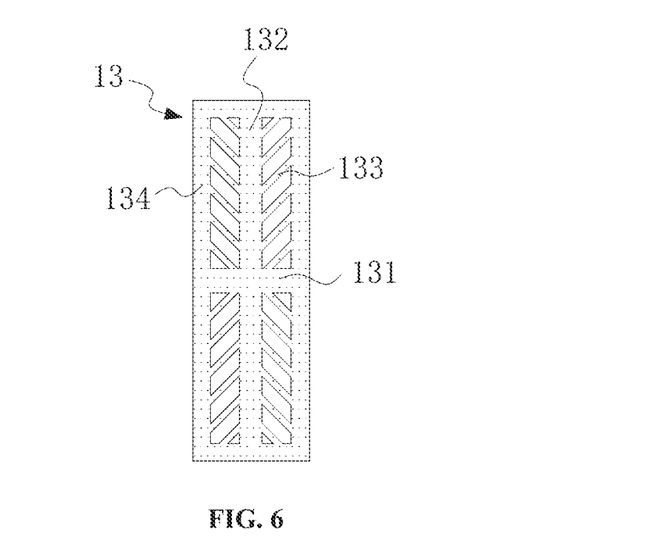
FIG. 6 is a schematic structural diagram of a third pixel electrode in a second display area according to an embodiment of the present disclosure.

Referring to FIG. 2 and FIG. 6, the pixel electrode layer 10 of an embodiment of the present disclosure further includes a plurality of third pixel electrodes 13, and the plurality of third pixel electrodes 13 are arranged in an array in the second display area AA2.

Referring to FIG. 6, each of the third pixel electrodes 13 includes a trunk electrode and branch electrodes 133 connected to the trunk electrode, the trunk electrode divides each of the third pixel electrodes 13 into at least four domains, the branch electrodes 133 in different domains extend in different directions, and the branch electrodes 133 in a same domain extend in a same direction.

Specifically, in the embodiment of the present disclosure, a four-domain pixel electrode is taken as an example, and the trunk portion includes a horizontal trunk electrode 131 and a vertical trunk electrode 132 that cross each other. Preferably, the horizontal trunk electrode 131 and the vertical trunk electrode 132 cross each other perpendicularly, to form a cross-shaped structure.

The horizontal trunk electrode 131 and the vertical trunk electrode 132 divide the third pixel electrode 13 into four domains, and the plurality of branch electrodes 133 in each of the domains are arranged in parallel and spaced apart from each other.

Since the second display area AA2 is only used for ordinary display and does not need to transmit external light, in order to maximize the transmittance, an angle between the plurality of branch electrodes 133 and the trunk electrodes connected thereto in each of the domains is 45 degrees or 135 degrees.

Further, in order to relieve the color shift, each of the third pixel electrodes 13 further includes an outer frame electrode 134 connected to ends of the plurality of branch electrodes 133, two opposite ends of the horizontal trunk electrode 131, and two opposite ends of the vertical trunk electrode 132.

Referring to FIGS. 4 and 5, in an embodiment of the present disclosure, any pixel electrode in the first display area AA1 has a two-domain design. Specifically, any pixel electrode of the first display area AA1 includes a first domain A and a second domain B, an extension direction of the branch portions 102 in the first domain A of any one of the first pixel electrodes 11 is same as an extension direction of the branch portions 102 in the second domain B of adjacent one of the second pixel electrodes 12, and an extension direction of the branch portions 102 in the second domain B of the first pixel electrodes 11 is same as an extension direction of the branch portions 102 in the first domain A of adjacent one of the second pixel electrode 12.

Preferably, an angle between the branch portions 102 in one of the domains of any one of the first pixel electrodes 11 and the branch portions 102 in corresponding one of the domains of adjacent one of the second pixel electrodes 12 is 90 degrees. For example, the angle between the branch portions in the first domain A of one pixel electrode 11 and the branch portions 102 in the first domain A of adjacent one of the second pixel electrodes 12 is 90 degrees. On the one hand, the angle between the branch portions 102 between adjacent domains is 90 degrees, which is beneficial to improve the transmittance of the display panel. On the other hand, the oblique electric field generated by different domains can induce liquid crystal molecules to incline in different directions, thereby achieving the effect of relieving the color shift.

In some embodiments, any adjacent ones of the first pixel electrodes 11 and the second pixel electrodes 12 are symmetrical to each other, which is beneficial to relieve the color shift at large viewing angles. Compared with the four-domain design in the prior art, the present disclosure is equivalent to splitting one pixel electrode into two pixel electrodes, so that the grating period becomes twice the original grating period and the diffraction angle becomes one-half of the original diffraction angle, thereby reducing diffraction effect.

In this embodiment, the first domain A and the second domain B in the same pixel electrode of the first display area AA1 are arranged along the second direction Y, and the first pixel electrodes 11 and the second pixel electrodes 12 are alternately arranged along the first direction X.

Preferably, an area of the first domain A and an area of the second domain B of any pixel electrode in the first display area AA1 are kept equal, which is beneficial to relieve the color shift at large viewing angles.

In an embodiment of the present disclosure, a width of the trunk portion of the pixel electrodes is greater than a width of the branch portions.

Figure 7:
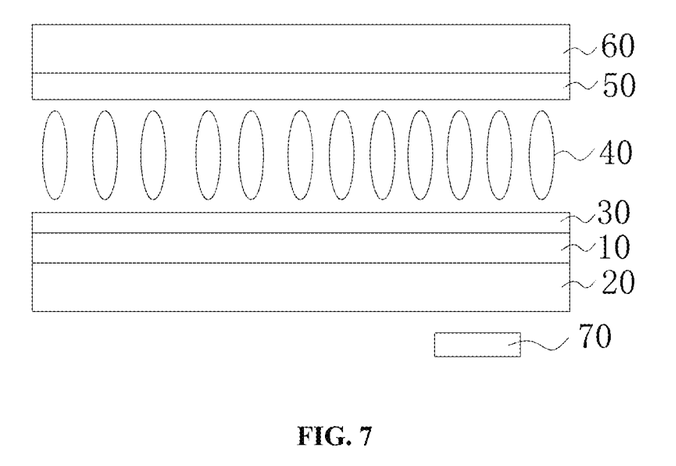
FIG. 7 is a schematic structural diagram of a display module provided by an embodiment of the present disclosure.

Referring to FIG. 7, the display panel 100 of the embodiment of the present disclosure includes an array substrate 20, a pixel electrode layer 10, a first alignment film 30, a liquid crystal layer 40, a second alignment film 50, and a color filter substrate 60, which are sequentially stacked.

The array substrate 20 includes a thin film transistor array, the color filter substrate 60 includes a color filter layer, and the specific structures of the array substrate 20 and the color filter substrate 60 can refer to the prior art, which will not be repeated herein for brevity.

The liquid crystal layer 40 includes vertical alignment (VA) liquid crystals, but is not particularly limited thereto.

An embodiment of the present disclosure also provides a display module, including the display panel 100 in any of the above-mentioned embodiments and an optical element 70. The optical element 70 is disposed on a side away from the light-exiting surface of the display panel 100, and the optical element 70 is disposed corresponding to the first display area AA1.

In this embodiment, the optical element 70 is disposed on a side of the array substrate 20 away from the color filter substrate 60.

In this embodiment, the optical element 70 includes but is not limited to a camera.

Figure 8:
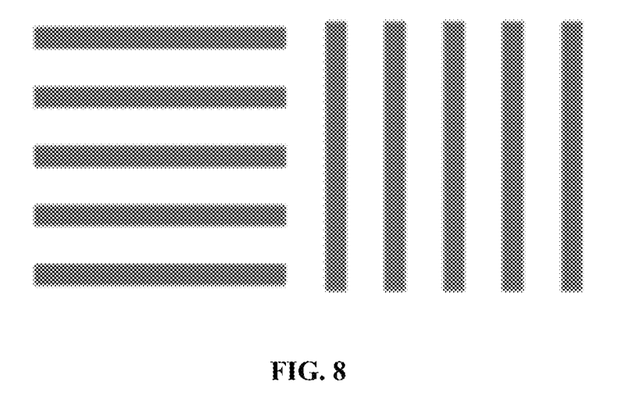
FIG. 8 is a photographing sample of an under-screen camera provided by an embodiment of the present disclosure.
Figure 9:
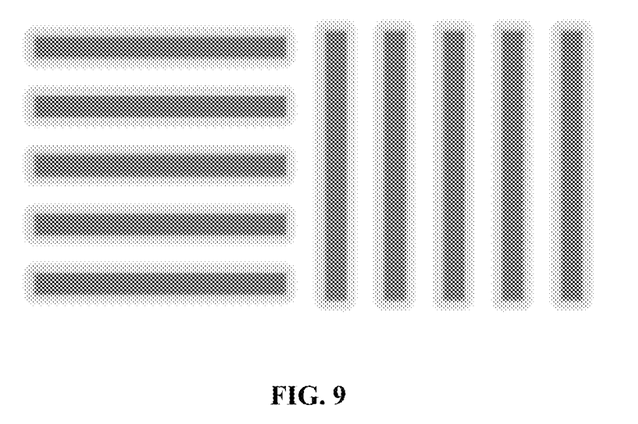
FIG. 9 is a photographing sample of an under-screen camera in the prior art.
Figure 10:
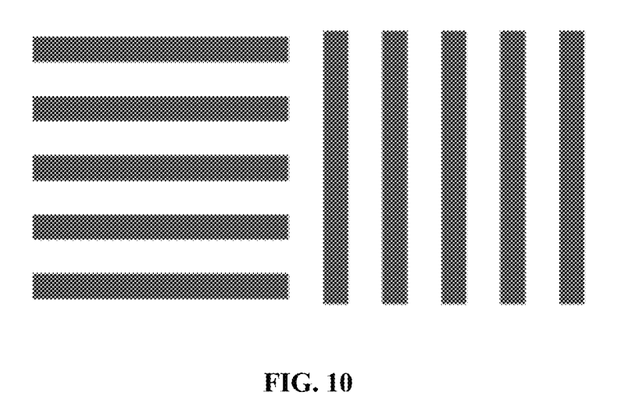
FIG. 10 is a photographing sample of a camera under a plain glass for comparison.

Referring to FIGS. 8-10, FIG. 8 is a photographing sample of an under-screen camera provided by an embodiment of the present disclosure. FIG. 9 is a photographing sample of an under-screen camera in the prior art. FIG. 10 is a photographing sample of a camera under a plain glass for comparison. In FIGS. 8 and 9, the trunk electrodes have the same width, the branch electrodes have the same width, distances between the branch electrodes are the same, and the extension directions of the branch electrodes are the same.

It can be seen from FIG. 8 to FIG. 10 that the photographing sample of the plain glass is the clearest, because light only needs to pass through the plain glass; and the photographing sample in FIG. 9 has more serious ghosting phenomenon and a blurred image, while the photographing sample in FIG. 8 is almost free of ghosting, and has a clearer image.

The display panel and the display module provided by embodiments of the present disclosure can increase a grating period of liquid crystals and reduce a diffraction angle through domain reduction design, thereby relieving diffraction phenomenon, reducing a blur degree of an image taken by a camera through a screen, and improving imaging quality of the under-screen camera.

It can be understood that for those of ordinary skill in the art, equivalent substitutions or changes can be made according to the technical solutions and inventive concepts of the present application, and all these changes or substitutions shall fall within the protection scope of the appended claims of the present application.

What is claimed is:

1. A display panel, comprising a first display area and a second display area surrounding the first display area, and comprising a pixel electrode layer, wherein the pixel electrode layer comprises:
    a plurality of first pixel electrodes and a plurality of second pixel electrodes arranged in an array in the first display area, wherein:
        the first pixel electrodes and the second pixel electrodes are alternately arranged along at least one of a first direction or a second direction, and the first direction and the second direction intersect each other;
        each of the first pixel electrodes and the second pixel electrodes comprises a trunk portion and a plurality of branch portions connected to the trunk portion, the trunk portion divides each of the first pixel electrodes and the second pixel electrodes into at most two domains, extension directions of the branch portions in different domains are different, and the extension directions of the branch portions in a same domain are same; and an angle between any one of the branch portions and the trunk portion is 45° or 135°; and an extension direction of the branch portions in one of the domains of any one of the first pixel electrodes is different from an extension direction of the branch portions in corresponding one of the domains of adjacent one of the second pixel electrodes, and any adjacent ones of the first pixel electrodes and the second pixel electrodes are symmetrical to each other; and a plurality of third pixel electrodes arranged in an array in the second display area, wherein each of the third pixel electrodes comprises one trunk electrode and one branch electrode connected to the trunk electrode, the trunk electrode divides each of the third pixel electrodes into at least four domains, the branch electrodes in different domains extend in different directions, the branch electrodes in a same domain extend in a same direction, the trunk electrode comprises a horizontal trunk electrode and a vertical trunk electrode, and the horizontal trunk electrode and the vertical trunk electrode cross each other perpendicularly to form a cross-shaped structure.

2. The display panel according to claim 1, wherein an angle between the branch portions in one of the domains of any one of the first pixel electrodes and the branch portions in corresponding one of the domains of adjacent one of the second pixel electrodes is 90 degrees.

3. The display panel according to claim 1, wherein each of the first pixel electrodes and the second pixel electrodes comprises a first domain and a second domain, the first domain and the second domain are arranged along the second direction, and the first pixel electrodes and the second pixel electrodes are alternately arranged along the first direction.

4. The display panel according to claim 3, wherein an extension direction of the branch portions in the first domain of any one of the first pixel electrodes is same as an extension direction of the branch portions in the second domain of adjacent one of the second pixel electrodes, and an extension direction of the branch portions in the second domain of the first pixel electrodes is same as an extension direction of the branch portions in the first domain of adjacent one of the second pixel electrodes.

5. The display panel according to claim 3, wherein an area of the first domain and an area of the second domain of any one of the first pixel electrodes or the second pixel electrodes are the same.

6. The display panel according to claim 1, wherein the trunk portion comprises a first trunk portion and a second trunk portion that intersect each other, the first trunk portion extends along the first direction, the second trunk portion extends in the second direction, and the first direction is perpendicular to the second direction.

7. The display panel according to claim 6, wherein any one of the first pixel electrodes and/or the second pixel electrodes comprises a frame, and the frame connects ends of the plurality of branch portions, ends of the first trunk portion, and ends of the second trunk portion.

8. A display panel, comprising a first display area and a second display area surrounding the first display area, and comprising a pixel electrode layer, wherein the pixel electrode layer comprises:

a plurality of first pixel electrodes and a plurality of second pixel electrodes arranged in an array in the first display area, wherein:

the first pixel electrodes and the second pixel electrodes are alternately arranged along at least one of a first direction or a second direction, and the first direction and the second direction intersect each other, each of the first pixel electrodes and the second pixel electrodes comprises a trunk portion and a plurality of branch portions connected to the trunk portion, the trunk portion divides each of the first pixel electrodes and the second pixel electrodes into at most two domains, extension directions of the branch portions in different domains are different, and the extension directions of the branch portions in a same domain are same; and an extension direction of the branch portions in one of the domains of any one of the first pixel electrodes is different from an extension direction of the branch portions in corresponding one of the domains of adjacent one of the second pixel electrodes; and a plurality of third pixel electrodes arranged in an array in the second display area, wherein each of the third pixel electrodes comprises a one trunk electrode and one branch electrode connected to the trunk electrode, the trunk electrode divides each of the third pixel electrodes into at least four domains, the branch electrodes in different domains extend in different directions, the branch electrodes in a same domain extend in a same direction, the trunk electrode comprises a horizontal trunk electrode and a vertical trunk electrode, and the horizontal trunk electrode and the vertical trunk electrode cross each other perpendicularly to form a cross-shaped structure.

9. The display panel according to claim 8, wherein an angle between the branch portions in one of the domains of any one of the first pixel electrodes and the branch portions in corresponding one of the domains of adjacent one of the second pixel electrodes is 90 degrees.

10. The display panel according to claim 8, wherein any adjacent ones of the first pixel electrodes and the second pixel electrodes are symmetrical to each other.

11. The display panel according to claim 10, wherein each of the first pixel electrodes and the second pixel electrodes comprises a first domain and a second domain, the first domain and the second domain are arranged along the second direction, and the first pixel electrodes and the second pixel electrodes are alternately arranged along the first direction.

12. The display panel according to claim 11, wherein an extension direction of the branch portions in the first domain of any one of the first pixel electrodes is same as an extension direction of the branch portions in the second domain of adjacent one of the second pixel electrodes, and an extension direction of the branch portions in the second domain of the first pixel electrodes is same as an extension direction of the branch portions in the first domain of adjacent one of the second pixel electrodes.

13. The display panel according to claim 11, wherein an area of the first domain and an area of the second domain of any one of the first pixel electrodes or the second pixel electrodes are the same.

14. The display panel according to claim 8, wherein the trunk portion comprises a first trunk portion and a second trunk portion that intersect each other, the first trunk portion extends along the first direction, the second trunk portion extends in the second direction, and the first direction is perpendicular to the second direction.

15. The display panel according to claim 14, wherein any one of the first pixel electrodes and/or the second pixel electrodes comprises a frame, and the frame connects ends of the plurality of branch portions, ends of the first trunk portion, and ends of the second trunk portion.

16. The display panel according to claim 8, wherein an angle between any one of the branch portions and the trunk portion is 45° or 135°.

17. The display panel according to claim 8, wherein the display panel further comprises:
   an array substrate;
   a color filter substrate disposed opposite to the array substrate; and
   a liquid crystal layer sandwiched between the array substrate and the color filter substrate.

18. A display module, comprising a display panel and an optical element, wherein the optical element is disposed on a side away from a light-exiting surface of the display panel, the optical element corresponds to a first display area of the display panel, and the display panel comprises the first display area and a second display area surrounding the first display area and comprises a pixel electrode layer, wherein the pixel electrode layer comprises:
   a plurality of first pixel electrodes and a plurality of second pixel electrodes arranged in an array in the first display area, wherein:
      the first pixel electrodes and the second pixel electrodes are alternately arranged along at least one of a first direction or a second direction, and the first direction and the second direction intersect each other;
      each of the first pixel electrodes and the second pixel electrodes comprises a trunk portion and a plurality of branch portions connected to the trunk portion, the trunk portion divides each of the first pixel electrodes and the second pixel electrodes into at most two domains, extension directions of the branch portions in different domains are different, and the extension directions of the branch portions in a same domain are same; and
      an extension direction of the branch portions in one of the domains of any one of the first pixel electrodes is different from an extension direction of the branch portions in corresponding one of the domains of adjacent one of the second pixel electrodes; and
   a plurality of third pixel electrodes arranged in an array in the second display area,
      wherein each of the third pixel electrodes comprises a one trunk electrode and one branch electrode connected to the trunk electrode, the trunk electrode divides each of the third pixel electrodes into at least four domains, the branch electrodes in different domains extend in different directions, the branch electrodes in a same domain extend in a same direction, the trunk electrode comprises a horizontal trunk electrode and a vertical trunk electrode, and the horizontal trunk electrode and the vertical trunk electrode cross each other perpendicularly to form a cross-shaped structure.

* * * * *